(12) United States Patent
Sainen et al.

(10) Patent No.: US 6,314,335 B1
(45) Date of Patent: Nov. 6, 2001

(54) FUZZY CONTROL APPARATUS FOR JET LOOM

(75) Inventors: Tsutomu Sainen; Zenji Tamura, both of Ishikawa-ken (JP)

(73) Assignee: Tsudakoma Kogyo Kabushiki Kaisha, Ishikawa-Ken (JP)

(*) Notice: Subject to any disclaimer, the term of this patent is extended or adjusted under 35 U.S.C. 154(b) by 0 days.

(21) Appl. No.: 09/232,334

(22) Filed: Jan. 15, 1999

(30) Foreign Application Priority Data

Mar. 10, 1998 (JP) .................................................. 10-75017

(51) Int. Cl.⁷ ............................. D03D 47/34; G06F 19/00
(52) U.S. Cl. ..................... 700/140; 139/1 R; 706/900; 706/904
(58) Field of Search ..................................... 700/140, 130; 706/900, 904; 139/1 R, 1 E, 435.1, 435.2, 429, 450, 452, 105

(56) References Cited

U.S. PATENT DOCUMENTS

| | | | |
|---|---|---|---|
| 4,458,726 | 7/1984 | Wenig | ..................................... 139/11 |
| 5,115,840 | * 5/1992 | Yamada | ............................. 139/435.2 |
| 5,134,568 | 7/1992 | Sainen | ................................... 364/470 |
| 5,322,089 | * 6/1994 | Yamada | ............................. 700/140 X |
| 5,440,495 | 8/1995 | Sainen et al. | ......................... 364/470 |

FOREIGN PATENT DOCUMENTS

| | | |
|---|---|---|
| 0382490 | 8/1990 | (EP) . |
| 0403175 | 12/1990 | (EP) . |
| 0503848 | 9/1992 | (EP) . |
| 0525514 | 2/1993 | (EP) . |
| 0542409 | 5/1993 | (EP) . |
| 0573656 | 12/1993 | (EP) . |
| 0708189 | 4/1996 | (EP) . |
| 2067606 | 7/1981 | (GB) . |

OTHER PUBLICATIONS

European Search Report, dated Dec. 21, 1999.

* cited by examiner

*Primary Examiner*—Peter Nerbun
(74) *Attorney, Agent, or Firm*—Webb Ziesenheim Logsdon Orkin & Hanson, P.C.

(57) ABSTRACT

A fuzzy control apparatus for a jet loom detects a flying state of a weft yarn, performs, based on a detected value thus detected, fuzzy inference to determine a modification amount to a rotational frequency of a motor, drives the motor to rotate at a predetermined rotational frequency, and corrects the rotational frequency of the motor based on the correction amount.

3 Claims, 16 Drawing Sheets

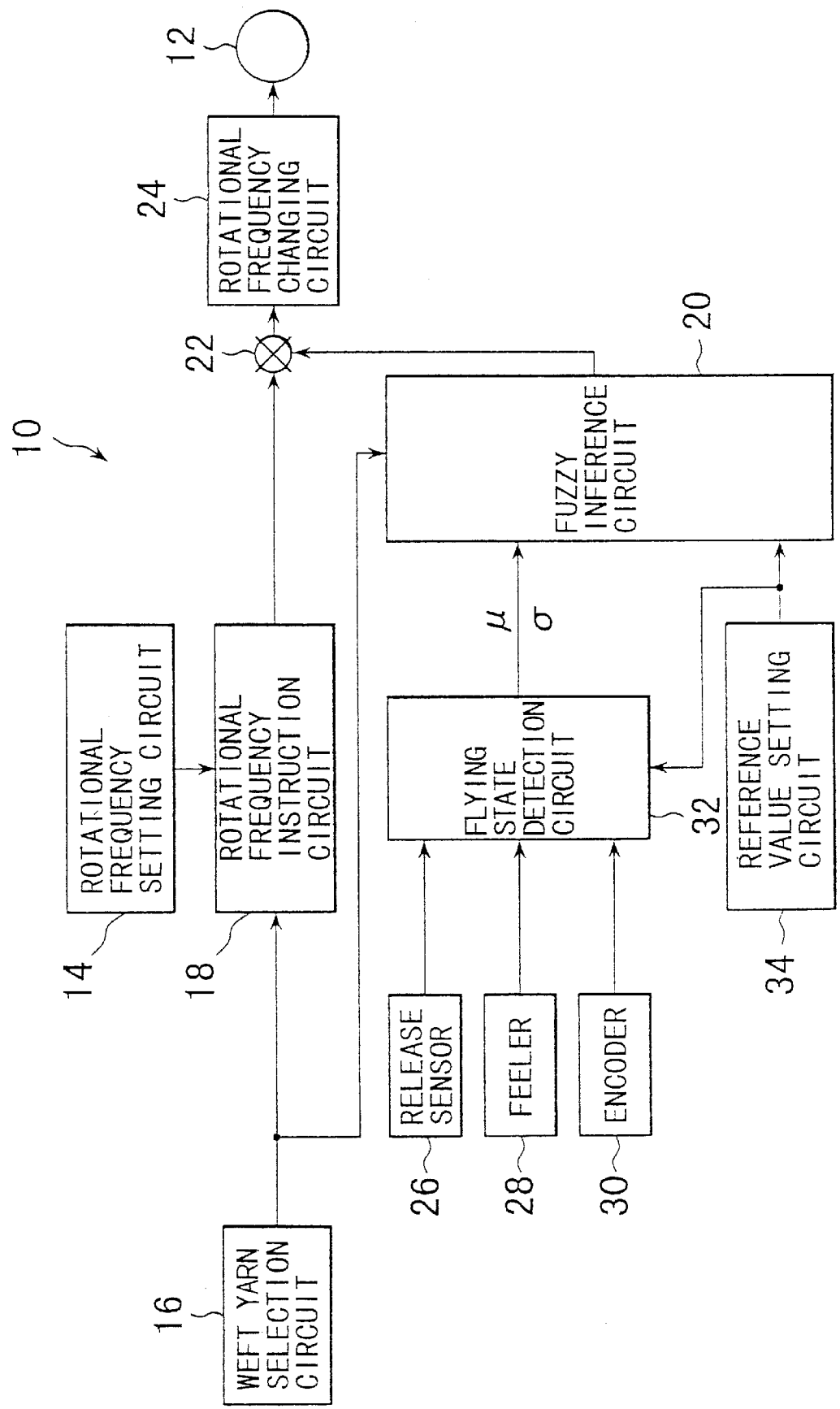

AVERAGE VALUE

STANDARD DEVIATION

ROTATIONAL FREQUENCY (PRESSURE)

FIG. 3

| MEMBERSHIP FUNCTION / CONTROL | INPUT | | OUTPUT |
|---|---|---|---|
| | ARRIVING TIMING | | ROTATIONAL FREQUENCY |
| | AVERAGE VALUE | STANDARD DEVIATION | |
| | P:LATE<br>Z:APPROPRIATE<br>N:EARLY | P:LATE<br>Z:APPROPRIATE<br>N:SMALL | P:LAISED<br>Z:APPROPRIATE<br>N:LOWERED |
| R1/1 | P | P | N |
| R1/2 | P | Z | N |
| R1/3 | P | N | N |
| R1/4 | Z | P | N |
| R1/5 | Z | Z | Z |
| R1/6 | Z | N | P |
| R1/7 | N | P | N |
| R1/8 | N | Z | P |
| R1/9 | N | N | P |

FIG. 9

| MEMBERSHIP FUNCTION / CONTROL RULE | INPUT | | | | OUTPUT | |
|---|---|---|---|---|---|---|
| | RELEASE TIMING | | ARRIVING TIMING | | ROTATIONAL FREQUENCY | PRESSURE |
| | AVERAGE VALUE | STANDARD DEVIATION | AVERAGE VALUE | STANDARD DEVIATION | | |
| | P: LATE<br>Z: APPROPRIATE<br>N: EARLY | P: LARGE<br>Z: APPROPRIATE<br>N: SMALL | P: LATE<br>Z: APPROPRIATE<br>N: EARLY | P: LARGE<br>Z: APPROPRIATE<br>N: SMALL | P: RAISED<br>Z: MAINTAINED<br>N: LOWERED | P: RAISED<br>Z: MAINTAINED<br>N: LOWERED |
| R2/1  | P | P | P | P | N | P |
| R2/2  | P | P | P | Z | N | P |
| R2/3  | P | P | P | N | N | P |
| R2/4  | P | P | Z | P | N | P |
| R2/5  | P | P | Z | Z | N | P |
| R2/6  | P | P | Z | N | N | P |
| R2/7  | P | P | N | P | N | P |
| R2/8  | P | P | N | Z | N | P |
| R2/9  | P | P | N | N | N | P |
| R2/10 | P | Z | P | P | N | P |
| R2/11 | P | Z | P | Z | N | Z |
| R2/12 | P | Z | P | N | Z | Z |
| R2/13 | P | Z | Z | P | Z | Z |
| R2/14 | P | Z | Z | Z | Z | Z |
| R2/15 | P | Z | Z | N | Z | Z |
| R2/16 | P | Z | N | P | Z | Z |
| R2/17 | P | Z | N | Z | Z | Z |
| R2/18 | P | Z | N | N | P | Z |
| R2/19 | P | N | P | P | P | Z |
| R2/20 | P | N | P | Z | N | Z |
| R2/21 | P | N | P | N | N | N |
| R2/22 | P | N | Z | P | N | N |
| R2/23 | P | N | Z | Z | Z | N |
| R2/24 | P | N | Z | N | Z | N |
| R2/25 | P | N | N | P | Z | N |
| R2/26 | P | N | N | Z | P | N |
| R2/27 | P | N | N | N | P | N |
| R2/28 | Z | P | P | P | N | P |
| R2/29 | Z | P | P | Z | N | P |
| R2/30 | Z | P | P | N | N | P |
| R2/31 | Z | P | Z | P | N | P |
| R2/32 | Z | P | Z | Z | Z | P |
| R2/33 | Z | P | Z | N | Z | P |
| R2/34 | Z | P | N | P | Z | P |
| R2/35 | Z | P | N | Z | P | P |
| R2/36 | Z | P | N | N | P | P |
| R2/37 | Z | Z | P | P | N | Z |
| R2/38 | Z | Z | P | Z | N | Z |
| R2/39 | Z | Z | P | N | N | Z |
| R2/40 | Z | Z | Z | P | N | Z |
| R2/41 | Z | Z | Z | Z | Z | Z |

FIG. 10

| MEMBERSHIP FUNCTION \ CONTROL RULE | INPUT | | | | OUTPUT | |
|---|---|---|---|---|---|---|
| | RELEASE TIMING | | ARRIVING TIMING | | ROTATIONAL FREQUENCY | PRESSURE |
| | AVERAGE VALUE | STANDARD DEVIATION | AVERAGE VALUE | STANDARD DEVIATION | | |
| | P:LATE<br>Z:APPROPRIATE<br>N:EARLY | P:LARGE<br>Z:APPROPRIATE<br>N:SMALL | P:LATE<br>Z:APPROPRIATE<br>N:EARLY | P:LARGE<br>Z:APPROPRIATE<br>N:SMALL | P:RAISED<br>Z:MAINTAINED<br>N:LOWERED | P:RAISED<br>Z:MAINTAINED<br>N:LOWERED |
| R2/42 | Z | Z | Z | N | Z | P |
| R2/43 | Z | Z | N | P | P | Z |
| R2/44 | Z | Z | N | Z | Z | Z |
| R2/45 | Z | Z | N | N | P | P |
| R2/46 | Z | N | P | P | P | Z |
| R2/47 | Z | N | P | Z | N | N |
| R2/48 | Z | N | P | N | N | P |
| R2/49 | Z | N | Z | P | N | Z |
| R2/50 | Z | N | Z | Z | N | N |
| R2/51 | Z | N | Z | N | N | P |
| R2/52 | Z | N | N | P | Z | Z |
| R2/53 | Z | N | N | Z | Z | N |
| R2/54 | Z | N | N | N | Z | P |
| R2/55 | N | P | P | P | Z | Z |
| R2/56 | N | P | P | Z | Z | N |
| R2/57 | N | P | P | N | P | P |
| R2/58 | N | P | Z | P | P | Z |
| R2/59 | N | P | Z | Z | N | N |
| R2/60 | N | P | Z | N | N | P |
| R2/61 | N | P | N | P | N | Z |
| R2/62 | N | P | N | Z | N | N |
| R2/63 | N | P | N | N | Z | P |
| R2/64 | N | Z | P | P | Z | Z |
| R2/65 | N | Z | P | Z | Z | N |
| R2/66 | N | Z | P | N | Z | P |
| R2/67 | N | Z | Z | P | Z | Z |
| R2/68 | N | Z | Z | Z | Z | N |
| R2/69 | N | Z | Z | N | Z | P |
| R2/70 | N | Z | N | P | Z | Z |
| R2/71 | N | Z | N | Z | P | N |
| R2/72 | N | Z | N | N | P | P |
| R2/73 | N | N | P | P | N | Z |
| R2/74 | N | N | P | Z | N | N |
| R2/75 | N | N | P | N | N | P |
| R2/76 | N | N | Z | P | Z | Z |
| R2/77 | N | N | Z | Z | Z | N |
| R2/78 | N | N | Z | N | Z | P |
| R2/79 | N | N | N | P | Z | Z |
| R2/80 | N | N | N | Z | P | N |
| R2/81 | N | N | N | N | P | N |

FIG. 17 (A) ROTATIONAL FREQUENCY
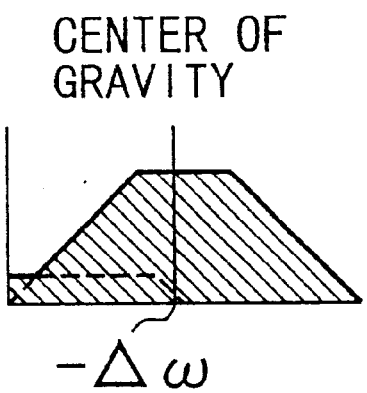
FIG. 17 (B) PRESSURE
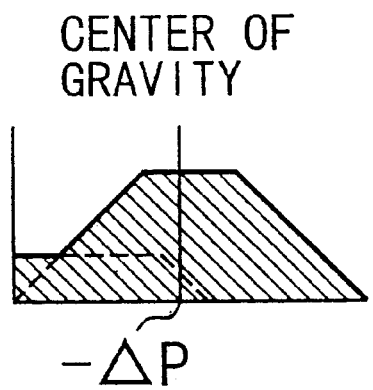

FUZZY CONTROL APPARATUS FOR JET LOOM

BACKGROUND OF THE INVENTION

1. Field of the Invention

The present invention relates to a fuzzy control apparatus for the rotational frequency of a motor in an air jet loom, a water jet loom or the like.

2. Description of the Prior Art

In a loom or weaving machine, it is desired to set the rotational frequency of a motor as a prime mover to an optimum value. To this end, a technique has been proposed wherein the rotational frequency of a motor connected to a main shaft is varied in response to an arriving timing at which a weft yarn arrives at a predetermined position, and is disclosed, for example, in Japanese Patent Appln. Public Disclosure (KOKAI) No. 56-107046. However, determination of an optimum rotational frequency relies much upon perception and the experience of the operator. Accordingly, it is difficult to automate the control of the rotational frequency.

For example, where the arriving timing has an early average value and has a large dispersion, the rotational frequency must be raised due to the early average value while the rotational frequency must be lowered due to the large dispersion, and the two controlling directions are opposite to each other. Further, even if an identical weft yarn is used, its characteristic is different delicately whether it is inserted in a test weaving stage or it is inserted in an actual product weaving stage. Furthermore, since the productivity of a woven fabric sometimes decreases as the rotational frequency increases but increases as the rotational frequency decreases, the productivity of a woven fabric must be taken into consideration to modify the rotational frequency. From those reasons, it is very difficult to determine an appropriate rotational frequency or an appropriate modification amount to the rotational frequency of a motor.

SUMMARY OF THE INVENTION

It is an object of the present invention to provide a fuzzy control apparatus which can control a jet loom to operate with an optimum rotational frequency or rotational speed determined taking the stability of insertion of a weft yarn and the productivity of a woven fabric into consideration.

In order to attain the object described above, according to the present invention, there is provided a fuzzy control apparatus for a jet loom, comprising flying state detection means for detecting a flying state of a weft yarn, fuzzy inference means for performing fuzzy inference to determine a modification amount to a rotational frequency of a motor based on a detection value detected by the detection means, and control means for driving the motor to rotate at a predetermined rotational frequency or speed and correcting the rotational frequency of the motor based on the modification amount.

The flying state of the weft yarn may be any of average values and dispersions of a timing of weft yarn releasing from a metering storage apparatus, an arriving timing of a weft yarn, a flying speed of a weft yarn, an arriving time (flying time) of a weft yarn at a predetermined position after starting of the flying, and so forth, or any combination of them. The fuzzy inference means performs, based on an actual value of such a flying condition, fuzzy inference for determining a fuzzy set using a plurality of membership functions and a plurality of fuzzy control rules to determine a modification amount to the rotational frequency of the motor.

Consequently, with the fuzzy control apparatus, a correct modification value to the rotational frequency can be obtained without relying upon perception or the experience of the operator, and the loom can be operated with an optimum rotational frequency determined taking the stability of weft yarn insertion and the productivity of a woven fabric into consideration.

The fuzzy control apparatus may be constructed such that the fuzzy inference means further determines, based on the detection value, a modification value to a pressure of weft yarn inserting fluid to be supplied to a weft yarn inserting nozzle, and the control means further supplies the weft yarn inserting fluid at a predetermined pressure to the weft yarn inserting nozzle and corrects the pressure of the weft yarn inserting fluid based on the modification value to the pressure. With the fuzzy control apparatus, a correct modification value to the pressure of the weft yarn inserting pressure fluid can also be obtained without relying upon perception or the experience of the operator, and as a result, weft yarn insertion is stabilized.

The fuzzy control apparatus may be further constructed such that the control means drives the motor to rotate at a reference rotational frequency set in advance and corrects the rotational frequency of the motor based on the modification amount, and supplies the weft yarn inserting fluid at a reference pressure set in advance to the weft yarn inserting nozzle and corrects the pressure of the weft yarn inserting fluid based on the modification amount to the pressure. The fuzzy control means for the rotational frequency and the fuzzy control means for the pressure can be formed as a common control circuit.

The above and other objects, features and advantages of the present invention will become apparent from the following description and the appended claims, taken in conjunction with the accompanying drawings in which like parts or elements are denoted by like reference symbols.

BRIEF DESCRIPTION OF THE DRAWINGS

FIG. 1 is a block diagram showing principal components of a jet loom provided with a fuzzy control apparatus of the present invention;

FIG. 3 is a table illustrating an example of fuzzy control rules used in fuzzy inference;

FIGS. 9 and 10 are a table illustrating fuzzy control rules used by the fuzzy control apparatus shown in FIGS. 8 and 9 respectively;

FIGS. 17(A) and 17(B) are diagrams illustrating different fuzzy sets.

DESCRIPTION OF THE PREFERRED EMBODIMENTS

Figure 2A:
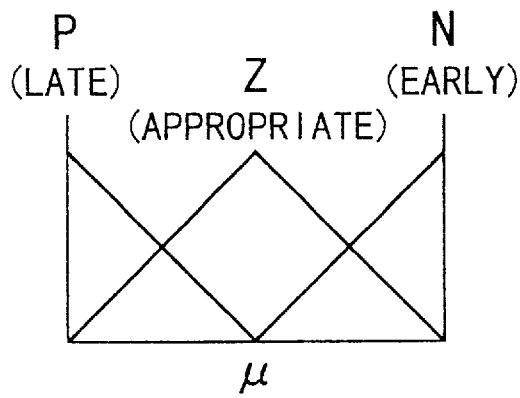
FIGS. 2(A), 2(B) and 2(C) are diagrams illustrating membership functions used in fuzzy inference.

FIG. 1 shows a basic construction of an air jet loom 10 for weaving a pile fabric of the multiple color weft yarn insertion type which is provided with a fuzzy control apparatus for the rotational frequency or rotational speed of a motor.

In the air jet loom 10, a reference value of the rotational frequency of the motor 12 or the main shaft is set in a rotational frequency setting circuit 14 for each of types of different weft yarns, and a weft yarn selection signal is set for each of the types of the different weft yarns in a weft yarn selection circuit 16. The weft yarn selection circuit 16 receives a one rotation signal of the main shaft of the loom and successively outputs weft yarn selection signals in a predetermined order in synchronism with the rotation of the main shaft.

Each time a weft yarn to be inserted is changed, a weft yarn selection signal is supplied from the weft yarn selection circuit 16 to a rotational frequency instruction circuit 18, a fuzzy inference circuit 20 and a loom control unit not shown for controlling yarn inserting systems.

The rotational frequency instruction circuit 18 obtains from the setting circuit 20, in response to a weft yarn selection signal outputted from the weft yarn selection circuit 16, a reference value for the rotational frequency corresponding to the weft yarn selection signal and supplies the thus obtained reference value to a rotational frequency changing circuit 24 through an adder 22.

The air jet loom 10 detects, by means of a release sensor 26, that a weft yarn has been released from a metering storage apparatus not shown, detects, by means of a weft yarn feeler 28, that the front end of the weft yarn has arrived at the side opposite to the weft yarn inserting side, and detects the rotational angle of the main shaft rotated by the motor 12 by means of an encoder 30. Detection signals from them are supplied to a flying state detection circuit 32. The metering storage apparatus is, for example, of the stationary drum type, and the release sensor 26 outputs a detection signal each time a weft yarn wound on the drum is released by one winding.

The flying state detection circuit 32 detects at least two actual values, that is, flight information of the flying state for each plurality of (n) picks and supplies the actual values, that is, detection values, to the fuzzy inference circuit 20.

The flying state or running state of a weft yarn can be selected from among average values, dispersions, actual values and combinations of them (for example, ratio between two flying states) of the initial release timing such as a rotational angle of the main shaft (initial release angle) when a weft yarn is released from an engaging pin of the metering storage apparatus, the last release timing such as a rotational angle of the main shaft (last release angle) when the weft yarn of a predetermined number of windings is released, for example, when the last winding of the weft yarn is released, the flight start timing or the flight end timing such as a rotational angle of the main shaft (flight start angle or flight end angle) when the flight of the weft yarn is started (or ended), the arriving timing such as a rotational angle of the main shaft (initial, intermediate or final arriving angle) when the end of the weft yarn arrives at a predetermined position in a shedding of warp yarns, the flying speed of the weft yarn, the arriving time (flying time) of the weft yarn from the start of flight to a predetermined position (for example, a final arriving position), and so forth.

Where the average value or dispersion of the flying state is used as the flying state, reference values for the same are set for individual ones of the different types of weft yarns and for each of different flying states in a reference value setting circuit 34. The reference values are read out and used for calculation of an average value or a dispersion by the flying state detection circuit 32.

For a detailed value of an average value of the flight information, there can be used one or a combination of at least two selected from among an average value itself, an average value error, that is, a difference between an average value and an aimed value therefor, an average value itself of a maximum value or a minimum value, a difference between an average value of the maximum value or minimum value and an aimed value therefor and so forth.

For a detailed value of a dispersion of the flight information, there can be used one or a combination of at least two selected from among a dispersion itself, a dispersion error, that is, a difference between a dispersion and an aimed value therefor, a dispersion itself of a maximum value or a minimum value, a difference between a dispersion of a maximum value or a minimum value and an aimed value therefor, a standard deviation and so forth.

For a detailed value of the actual value of the flight information, there can be used one or a combination of at least two selected from among a maximum value or a minimum value, an actual value error, that is, a difference between a maximum value or a minimum value and an aimed value therefor, a difference between a maximum value or a minimum value and an aimed value therefor, and so forth.

The fuzzy inference circuit 20 performs fuzzy inference of the modification amount to the rotational frequency using at least two actual values supplied thereto from the flying state detection circuit 32, a plurality of membership functions for rotational frequency control and a plurality of fuzzy control rules for rotational frequency control and supplies the thus inferred modification amount to the rotational frequency changing circuit 24 through the adder 22.

The inference of the modification amount to the rotational amount by the fuzzy inference circuit 20 is started when the motor 12 is rotated, after the type of the weft yarn to be inserted is changed over, with a reference value supplied from the rotational frequency instruction circuit 18 for a predetermined period of time while the flying state of the weft yarn is detected by the flying state detection circuit 32 and, after the predetermined period of time passes, the actual value of the flying state is calculated by the flying state detection circuit 32 and is supplied from the flying state detection circuit 32 into the fuzzy inference circuit 20.

Consequently, since no modification amount is outputted from the fuzzy inference circuit 20 for the predetermined period of time after the type of the weft yarn is changed over, the rotational frequency changing circuit 24 causes the motor 12 to rotate with the reference value supplied from the rotational frequency instruction circuit 18. Then, when a modification amount is outputted from the fuzzy inference circuit 20, the rotational frequency changing circuit 24 modifies the rotational frequency of the motor 12 by the modification amount supplied from the fuzzy inference circuit 20. Consequently, the motor 12 is rotated at an optimum rotational frequency.

The fuzzy inference of the modification amount to the rotational frequency is performed for each weft yarn insertion of several picks until changing over of the type of the weft yarn is performed after the first inference. To this end, the flying state detection circuit 32 detects the flying state and calculates an actual value of the detected flying state for each weft yarn insertion of a plurality of picks. Further, the rotational frequency changing circuit 24 modifies the rotational frequency of the motor 12 each time a modification amount to the rotational frequency is supplied thereto.

In the following, an example is described wherein the fuzzy control apparatus shown in FIG. 1 fuzzy-infers a modification value to the rotational frequency and controls the rotational frequency of the motor using, as the flying state of the weft yarn, detailed values $\mu$ and a of the average value and the dispersion of a final arriving timing (hereinafter referred to simply as arriving timing) which is a rotational angle of the main shaft (final arriving angle) when an end of the weft yarn is detected by the weft yarn feeler 28 provided on the side opposite to the yarn supply side. Here, a standard deviation is used as the deviation.

Therefore, in the fuzzy control apparatus shown in FIG. 1, an average value of the arriving timing and a reference value for the standard deviation are set for each of the different weft yarn types in the reference value setting circuit 34, and the flying state detection circuit 32 detects an average value $\mu$ and a standard deviation $\sigma$ of the arriving timing whereas the fuzzy inference circuit 20 obtains the average value $\mu$ and the standard deviation $\sigma$ of the arriving timing for each predetermined pick number n (or k) from the reference value setting circuit 34.

Figure 2B:
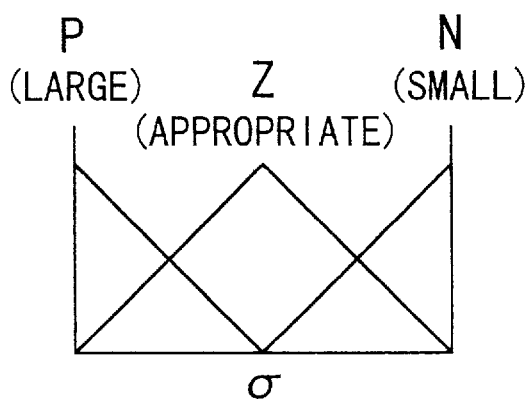
Figure 2C:
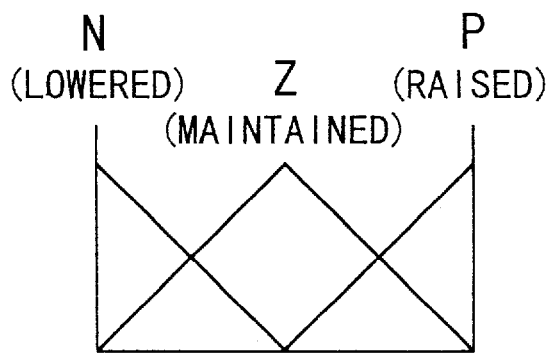

The fuzzy inference circuit 20 stores therein a plurality of membership functions for rotational frequency illustrated in FIGS. 2(A) to 2(C) and a plurality of fuzzy control rules R1/1 to R1/9 for rotational frequency control illustrated in FIG. 3. The membership functions illustrated in FIGS. 2(A) to 2(C) are stored in a memory provided in the fuzzy inference circuit 20 for each average value $\mu$ of the arriving timing, for each standard deviation $\sigma$ of the arriving timing and for each rotational frequency. Also the fuzzy control rules are stored in the memory.

The membership functions P, Z and N for the average value of the arriving timing illustrated in FIG. 2(A) correspond to the languages that the average value $\mu$ is "late", "substantially suitable (appropriate)" and "early", respectively, and represent likelihood with which the corresponding average value $\mu$ belongs to a set of the language.

The membership functions P, Z and N for the standard deviation of the arriving timing illustrated in FIG. 2(B) correspond to the languages that the standard deviation $\sigma$ is "large", "not large and not small (appropriate)" and "small", respectively, and represent likelihood with which the standard deviation a belongs to a set of the corresponding language.

The membership functions illustrated in FIGS. 2(A) and 2(B) are used for inference of to what degree the average value $\mu$ and the standard deviation a coincide with the antecedent part of a fuzzy control rule, that is, for inference of a grade W of membership. However, the membership functions illustrated in FIG. 2(A) or 2(B) may be used commonly for both of the average value $\mu$ and the standard deviation value $\sigma$ of the arriving timing.

The membership functions N, Z and P for the rotational frequency modification illustrated in FIG. 2(C) correspond to the languages that the rotational frequency of the motor is to be "lowered", "hardly changed" and "raised", respectively, and represent likelihood with which the corresponding parameter belongs to a set of the corresponding language. Further, the membership functions N, Z and P for the rotational frequency modification are used to infer the consequent part (function U) of a fuzzy control rule based on the grade W of membership.

The fuzzy control rules R1/1 to R1/9 illustrated in FIG. 3 have the following meanings:

R1/1: If the average value of the arriving timing is late (P) and the standard deviation of the arriving timing is large (P), then the rotational frequency is lowered (N).

R1/2: If the average value of the arriving timing is late (P) and the standard deviation of the arriving timing is appropriate (Z), then the rotational frequency is lowered (N).

R1/3: If the average value of the arriving timing is late (P) and the standard deviation of the arriving timing is small (N), then the rotational frequency is lowered (N).

R1/4: If the average value of the arriving timing is appropriate (Z) and the standard deviation of the arriving timing is large (P), then the rotational frequency is lowered (N).

R1/5: If both the average value and the standard deviation of the arriving timing are appropriate (Z), then the rotational frequency is maintained (Z).

R1/6: If the average value of the arriving timing is appropriate (Z) and the standard deviation of the arriving timing is small (N), then the rotational frequency is raised (P).

R1/7: If the average value of the arriving timing is early (N) and the standard deviation of the arriving timing is large (P), then the rotational frequency is lowered (N).

R1/8: If the average value of the arriving timing is early (N) and the standard deviation of the arriving timing is appropriate (Z), then the rotational frequency is raised (P).

R1/9: If the average value of the arriving timing is early (N) and the standard deviation of the arriving timing is small (N), then the rotational frequency is raised (P).

Figure 4:
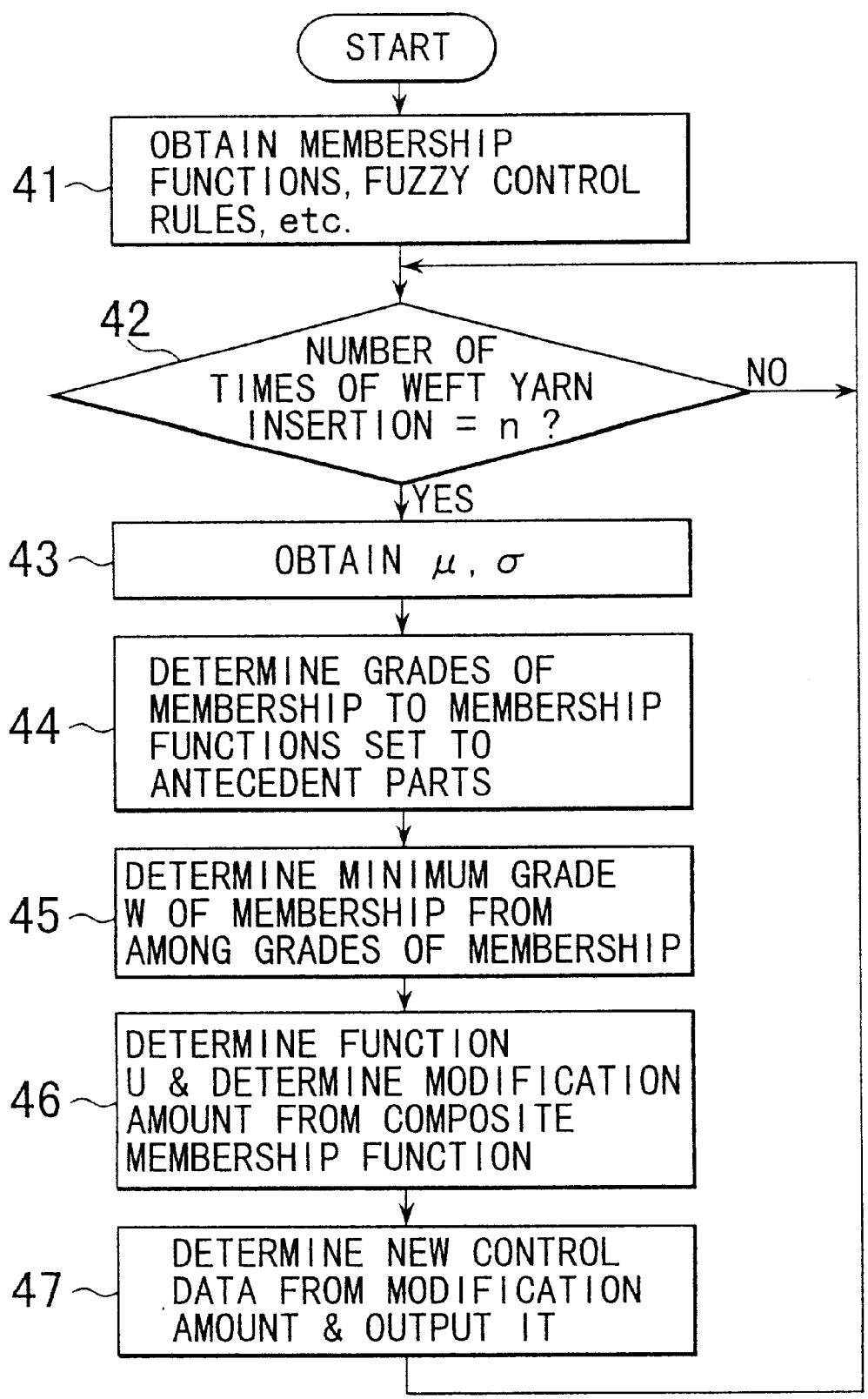
FIG. 4 is a flow chart illustrating a fuzzy inference circuit.

Subsequently, a controlling method for weft yarn insertion is described with reference to FIG. 4.

First, if the weft yarn selection circuit 16 outputs a weft yarn selection signal, then the motor 12 is rotated with a reference value set by the rotational frequency setting circuit 14 for a predetermined period of time. Meanwhile, the flying state detection circuit 32 receives output signals of the feeler 28 and encoder 30 and detects an arriving timing, and calculates an average value and a standard deviation of the arriving timing at a point of time when the predetermined time passes.

Further, as the weft yarn selection signal is supplied from the weft yarn selection circuit 16, the fuzzy inference circuit 20 obtains a membership function, a fuzzy control rule and so forth from a predetermined memory into an internal memory (step 41) and then waits until the number of times of weft yarn insertion reaches a predetermined number (n)(step 42).

After the number of times of weft yarn insertion reaches the predetermined number n, the fuzzy inference circuit 20 obtains an average value and a standard deviation of the arriving timing from the flying state detection circuit 32 (step 43).

Then, the fuzzy inference circuit 20 determines, based on the data obtained thereto, coincidence degrees of the average value and the standard deviation of the arriving timing with the antecedent parts of the fuzzy control rules R1/1 to R1/9, that is, the grades W1/1 to W1/9 of membership individually for the fuzzy control rules R1/1 to R1/9 (step 44).

Then, the fuzzy inference circuit 20 determines, based on the thus determined grades W1/1 to W1/9 of membership and the membership functions illustrated in FIG. 2(C), the consequent parts of the fuzzy control rules R1/1 to R1/9, that is, the functions U1/1 to U1/9, individually for the fuzzy control rules R1/1 to R1/9 (step 45).

Figure 5:
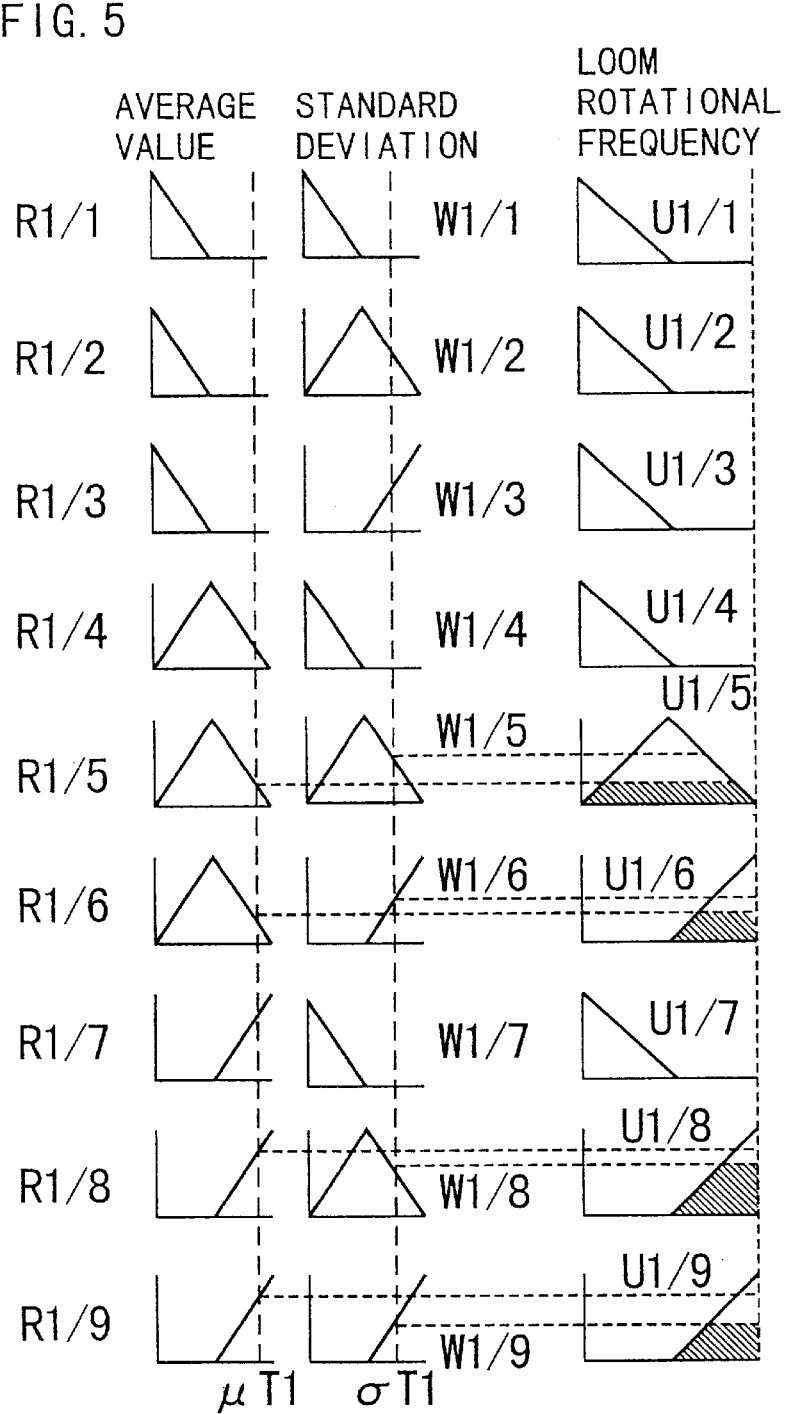
FIG. 5 is a diagrammatic view illustrating fuzzy inference.
Figure 6:
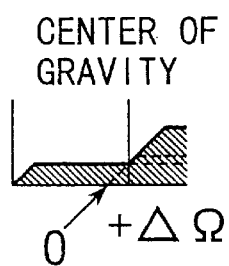
FIG. 6 is a diagram illustrating a fuzzy set.

The grades W1/1 to W1/9 of membership and the functions U1/1 to U1/9 are determined in such a manner as illustrated in FIGS. 5 and 6. The determination is described below in connection with the fuzzy control rule R1/5 taken as a representative.

The fuzzy inference circuit 20 first determines the grades of membership with the membership functions P, Z and N set in the antecedent part corresponding to the average value and the standard deviation of the arriving timing as seen from R1/5 of FIG. 5 (step 44), and sets the common part of the grades of membership, that is, the lowest grade of membership, as a grade of membership corresponding to the antecedent part of the fuzzy control rule R1/5 (step 45).

Then, the fuzzy inference circuit 20 cuts (clips) the membership functions P, Z and N of the consequent part of the fuzzy control rule R1/5 with the thus determined grade W1/5 of membership and determines the minimum value between the thus determined grade W1/5 of membership and the membership functions P, Z and N (this signifies the common portion and is indicated by slanting lines in FIG. 5) (step 46). The function U1/5 of the fuzzy control rule R1/5 is inferred in this manner.

Similarly, also the functions U1/1 to U1/4 and U1/6 to U1/9 of the other fuzzy control rules R1/1 to R1/4 and R1/6 to R1/9 are inferred. It is to be noted that, where the grade W of membership is 0, also the corresponding function U is zero.

Then, the fuzzy inference circuit 20 superposes the thus determined functions U1/1 to U1/9 on one another as seen in FIG. 6 to compose them to determine a composite membership function of the rotational frequency, that is, a fuzzy set, and determines the value $\Delta\Omega$ of the center of gravity of the fuzzy set of the rotational frequency (step 46).

The value $\Delta\Omega$ of the center of gravity is a value on the axis of abscissa which divides the area of the composite membership function to one half, and the fuzzy inference circuit 20 sets this value as the settled value of the inference result of the entire fuzzy control rules R1/1 to R1/9, that is, the modification amount $\Delta\Omega$ by which the rotational frequency is to be adjusted (step 46). Accordingly, the modification amount $\Delta\Omega$ has a value equal to zero or a positive or negative value.

The thus obtained modification amount $\Delta\Omega$ is added to the rotational frequency at present by the adder 22 to calculate a new rotational frequency (step 47). The new rotational frequency is higher than the rotational frequency at present if the modification amount $\Delta\Omega$ is in the positive, but is lower than the rotational frequency at present if the modification amount $\Delta\Omega$ is in the negative.

The new rotational frequency obtained in such a manner as described above is supplied to the rotational frequency changing circuit 24. Consequently, the rotational frequency changing circuit 24 causes the motor 12 to rotate at the new rotational frequency.

It is to be noted that the fuzzy inference circuit 20 may obtain, from the reference value setting circuit 34, two or more reference values for the flying state corresponding to a weft yarn selection signal supplied from the weft yarn selection circuit 16 and modify a corresponding plurality of membership functions so that their centers (for example, the centers on the axis of abscissa in FIGS. 2(A) to 2(C)) may coincide with the obtained reference values.

Figure 7:
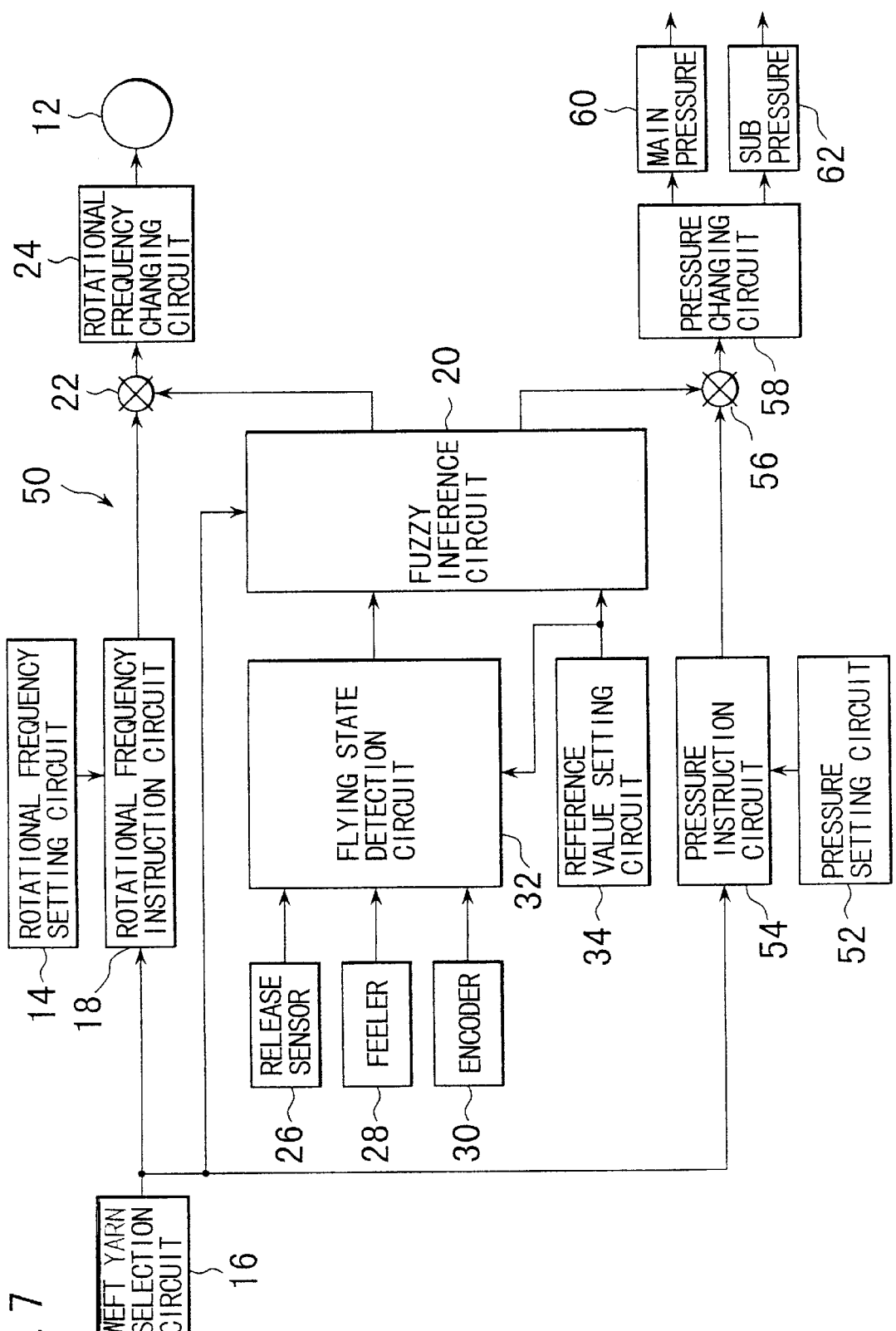
FIG. 7 is a block diagram showing an embodiment of principal components of a jet loom provided with another fuzzy control apparatus of the present invention.

FIG. 7 shows a basic construction of an air jet loom 50 which performs weaving of a pile fabric with weft yarns of multiple colors inserted therein and includes a fuzzy control apparatus which fuzzy infers both of the rotational frequency of the motor 12 and the pressure of the fluid for weft yarn insertion.

In the air jet loom 50, a modification amount to the pressure of the weft yarn inserting pressure fluid is also performed by the fuzzy inference circuit 20. To this end, in the air jet loom 50, a reference value for the pressure of the weft yarn inserting pressure fluid is set for each of different types of yarns in a pressure setting unit 52, and a weft yarn selection signal is further supplied from the weft yarn selection circuit 16 to a pressure instruction circuit 54.

The pressure instruction circuit 54 obtains, in response to a weft yarn selection signal outputted from the weft yarn selection circuit 16, a reference value for the pressure corresponding to the weft yarn selection signal from the rotational frequency setting circuit 14 and supplies the thus obtained reference value to a pressure changing circuit 58 through an adder 56.

The pressure changing circuit 58 varies, in the apparatus shown in FIG. 7, both of a main pressure 60 which is a pressure of compressed air to be jetted from a main nozzle and a sub pressure 62 which is a pressure of compressed air to be jetted from a sub nozzle. However, the pressure changing circuit 58 may alternatively vary only one of the main pressure 60 and the sub pressure 62 in response to the modification amount, the type of the applied weft yarn, the flying state of the weft yarn and so forth.

In the air jet loom 50 shown in FIG. 7, the fuzzy inference circuit 20 fuzzy infers the modification amount to the pressure using actual values of a plurality of flying states outputted from the flying state detection circuit 32, a plurality of membership functions for pressure control and a plurality of fuzzy control rules for pressure control, and supplies the thus inferred modification amount to the pressure changing circuit 58.

The membership functions for pressure control may be used in common with the membership functions for rotational frequency control. The fuzzy inference of the modification amount to the pressure by the fuzzy inference circuit 20 may be performed in synchronism with the fuzzy inference of the modification amount to the rotational frequency or may be performed independently of the fuzzy inference of the modification amount to the rotational frequency.

In either case, the fuzzy inference of the modification amount to the pressure by the fuzzy inference circuit 20 is started when, after the type of the weft yarn is changed over, the main pressure and the sub pressure are kept at the reference values supplied thereto from the pressure instruction circuit 54 for a predetermined period of time and the flying state detection circuit 32 calculates an actual value of the flying state of the weft yarn and then weft yarn insertion is performed by a predetermined number of times.

To this end, the pressure changing circuit 58 keeps, for the predetermined period of time after the type of the weft yarn is changed over, the pressure of the weft yarn inserting fluid to the reference value supplied from the pressure instruction circuit 54. Then, each time a modification amount to the pressure is supplied from the fuzzy inference circuit 20, the pressure changing circuit 58 modifies the main pressure and the sub pressure by the modification amounts supplied from the fuzzy inference circuit 20. Also the modification amount to the pressure is fuzzy-inferred each time weft yarn insertion of a plurality of picks is performed for a period of time until changing over of the type of the weft yarn is performed after the first inference.

Figure 8:
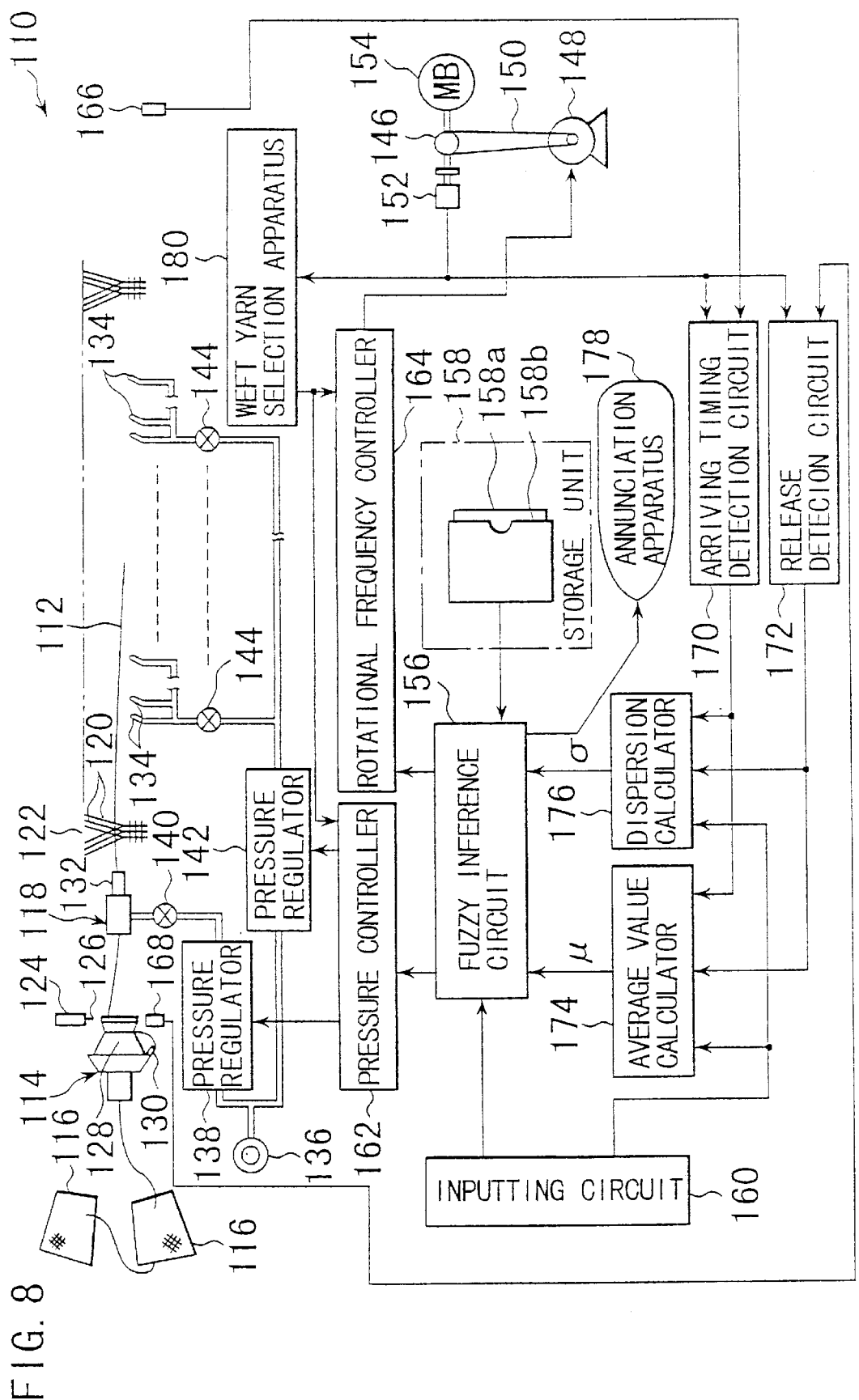
FIG. 8 is a detailed block diagram showing the jet loom of FIG. 7.
Figure 11:
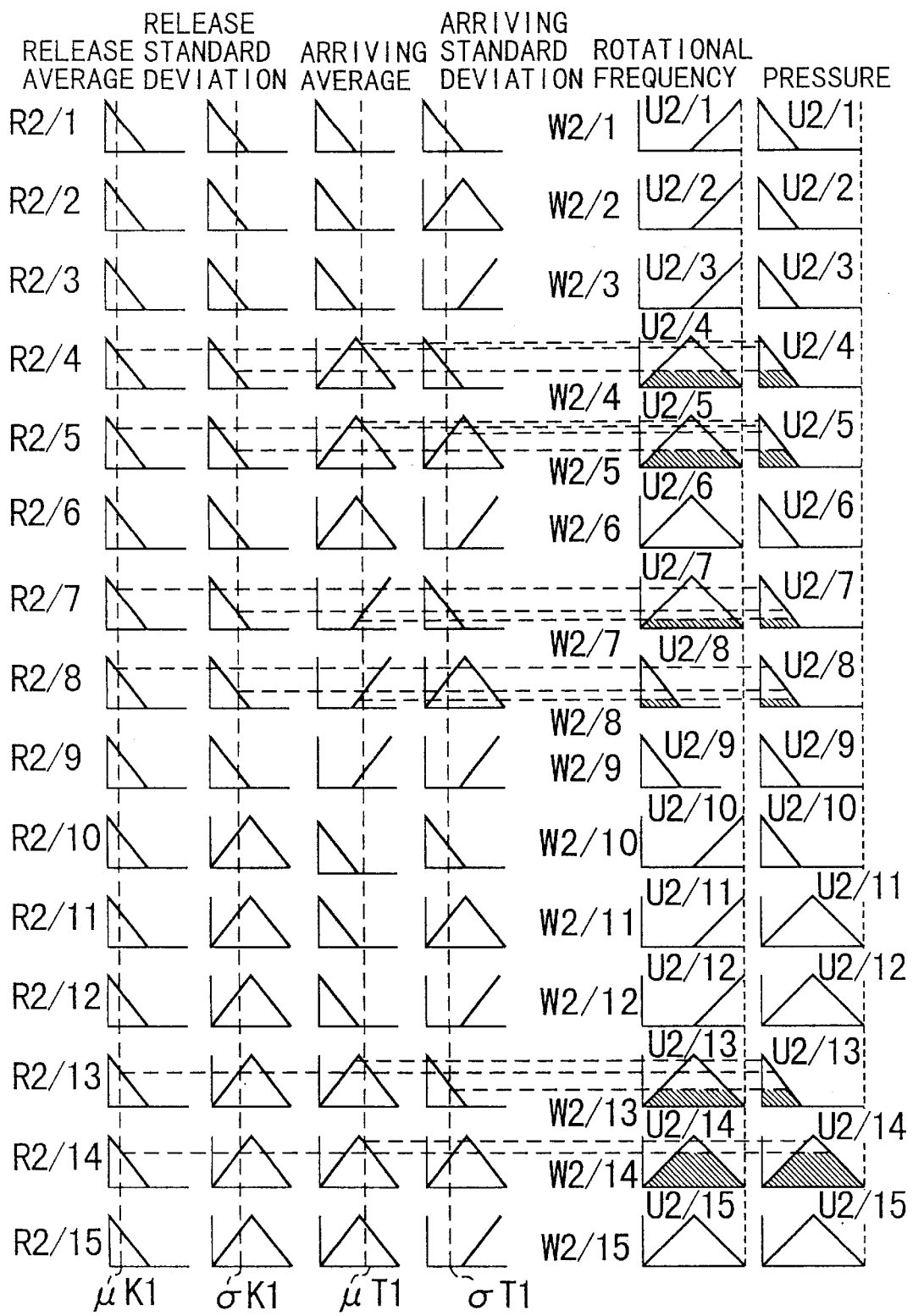
FIGS. 11 to 16 are diagrammatic views illustrating fuzzy inference by the fuzzy control apparatus shown in FIGS. 9–15.
Figure 12:
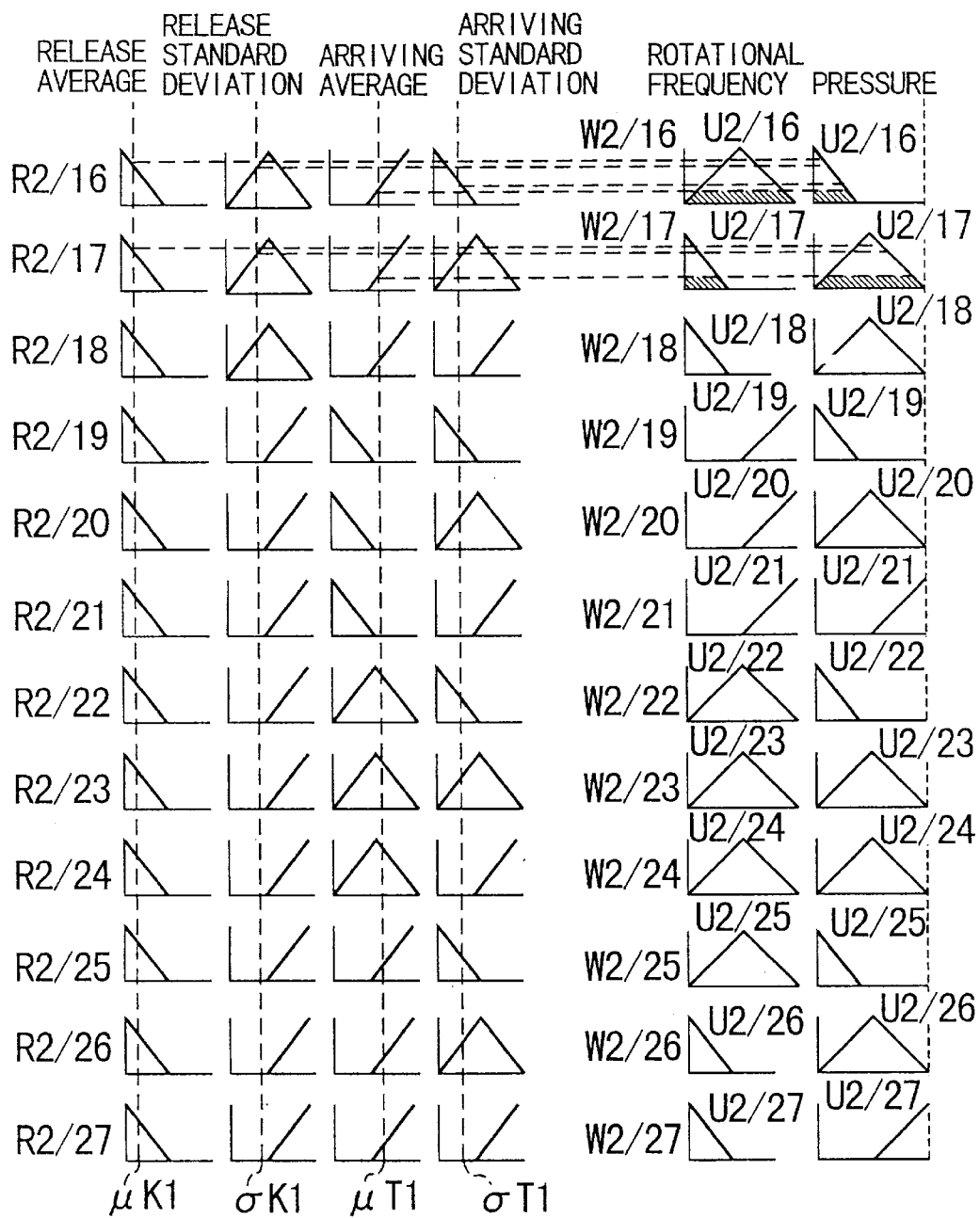
Figure 13:
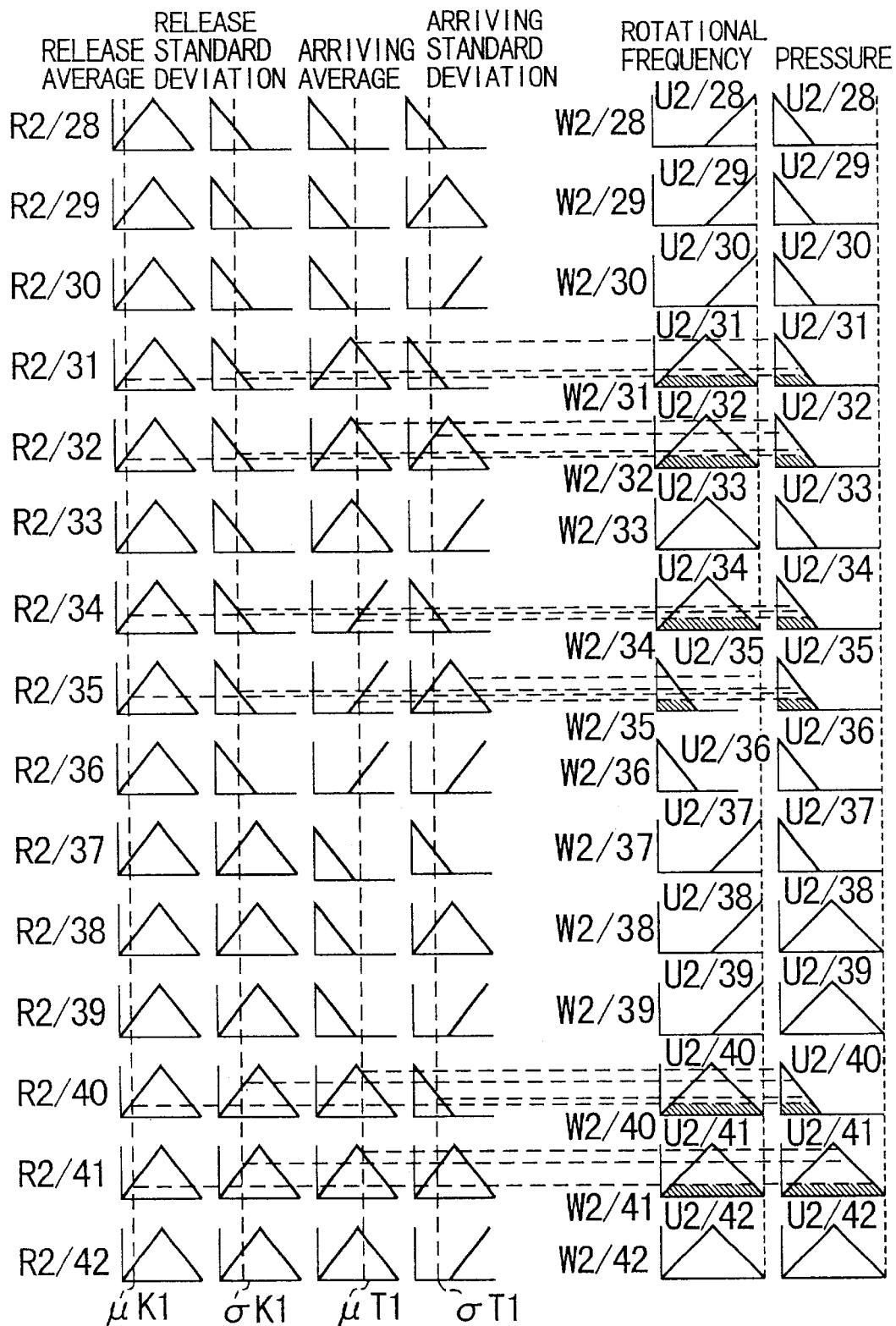
Figure 14:
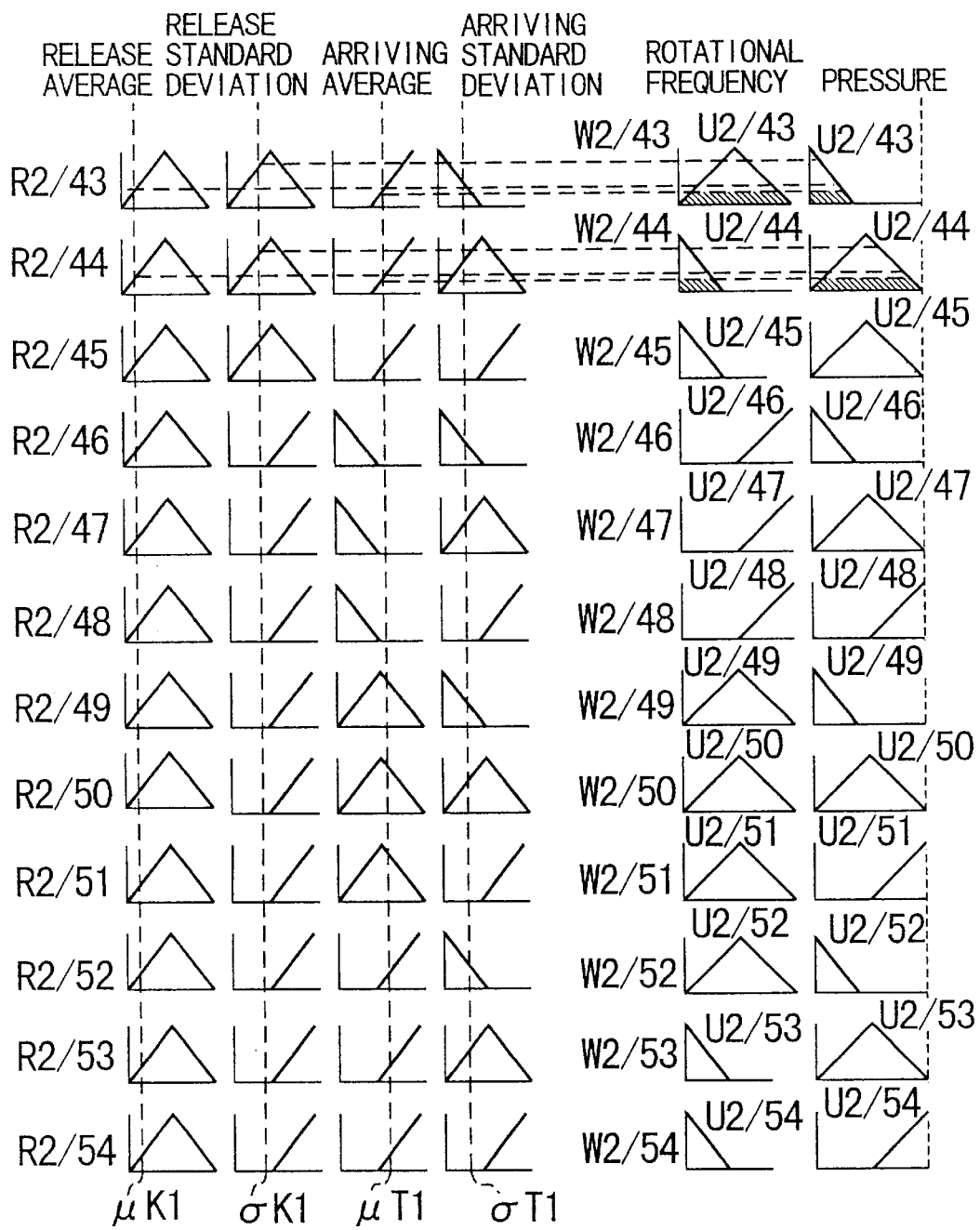
Figure 15:
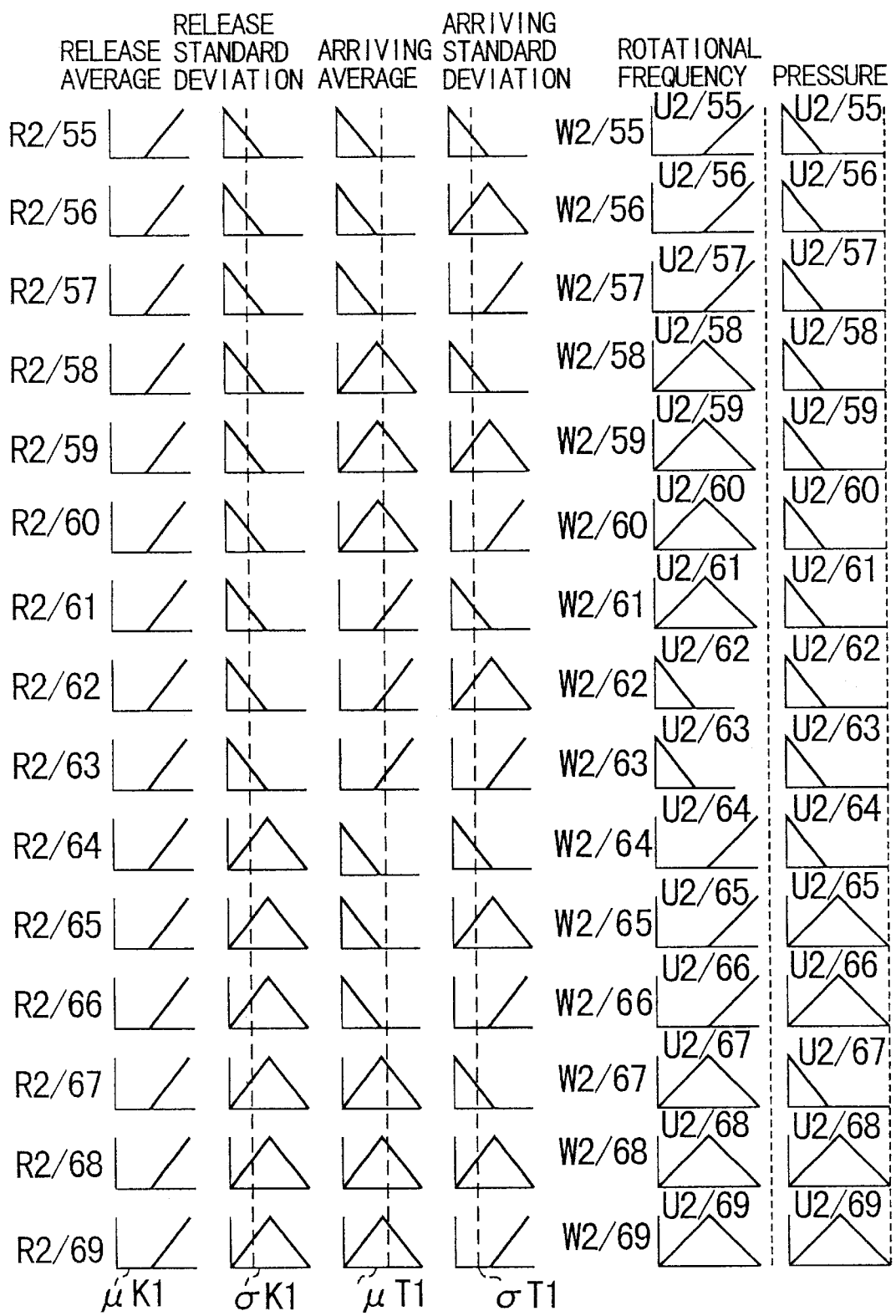
Figure 16:
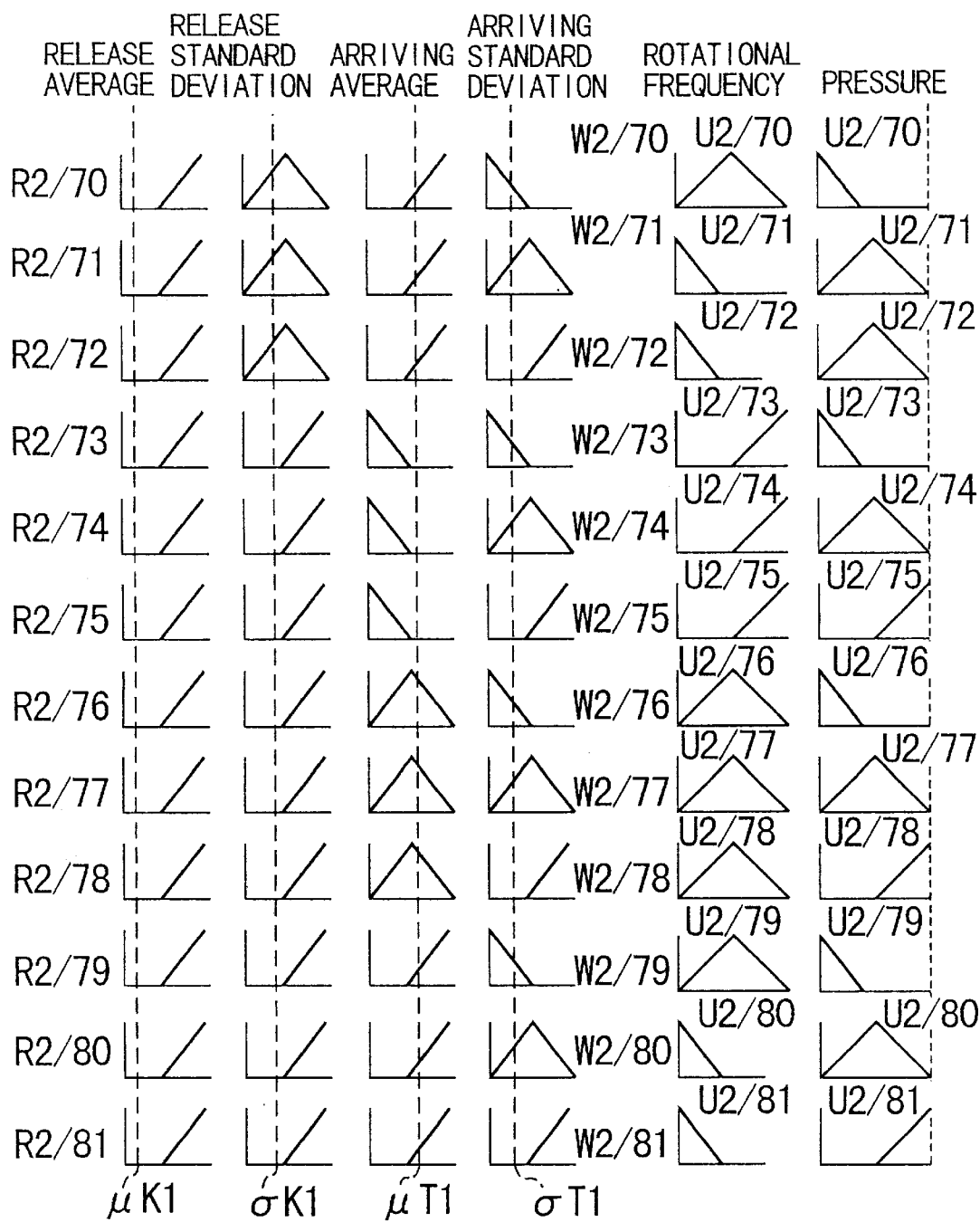

FIG. 8 shows a more detailed construction of the air jet loom which performs weaving of a pile fabric with weft yarns of multiple colors inserted therein described above with reference to FIG. 7. However, the jet loom shown in FIG. 8 may be used as the jet loom shown in FIG. 1.

Referring to FIG. 8, the jet loom 110 includes a plurality of drum type metering storage apparatus 114 provided individually for a plurality of types of weft yarns 112. Each of the weft yarns 112 is wound divisionally on a plurality of yarn feeders 116.

Each of the weft yarns 112 is supplied from one of the corresponding yarn feeders 116 through the metering storage apparatus 114 to a known weft yarn insertion unit 118, by which it is inserted into a shedding 122 of warp yarns 120. Weft yarns wound on the yarn feeders 116 for a same weft yarn type are connected to each other so that they may act as a single weft yarn, that is, they may be successively extracted by the corresponding metering storage apparatus 114 beginning with a weft yarn wound on one of the yarn feeders 116.

On metering, as releasing a weft yarn 112 from a metering and storing drum 128 is prevented by an engaging pin 126 which is operated by an electromagnetic solenoid 124, the weft yarn 112 is wound by a predetermined length around the outer periphery of the metering and storing drum 128 by rotation of a yarn guide 130 and is kept on the metering and storing drum 128.

On the other hand, upon weft yarn insertion, each weft yarn 112 is released from the drum 128 as the engaging pin 126 is disengaged, and is jetted from a main nozzle 132 of the weft yarn insertion unit 118 together with fluid so that it is inserted into the shedding 122 of the warp yarns 120, whereafter it is cut. The weft yarn insertion unit 118 includes a plurality of subnozzles 134 for jetting, upon weft yarn insertion, the fluid to advance the weft yarn 112 in a predetermined direction.

To the main nozzle 132, the working fluid (compressed air) for weft yarn insertion is supplied from a pressure source 136 through a pressure regulator 138 and an opening and closing valve 140. Meanwhile, to the subnozzles 134, the working fluid from the pressure source 136 is supplied through a pressure regulator 142 and corresponding opening and closing valve 144.

Though not shown, the metering storage apparatus 114, main nozzle 132, pressure regulator 138 and opening and closing valve 140 are provided for each of the different types of the weft yarns 112. However, the subnozzles 134 are used in common with all weft yarns.

The jet loom 110 includes a motor 148 for a main shaft 146 which drives the reed. Rotation of the motor 148 is transmitted to the main shaft 146 by a coupling mechanism 150. An encoder 152 for generating a rotational angle signal corresponding to the rotational angle of the main shaft 146 and an electromagnetic brake 154 for the main shaft 146 are connected to the main shaft 146.

The metering storage apparatus 114 and the weft yarn insertion unit 118 are driven in synchronism with rotation of the main shaft 146 together with the healds, reed and so forth. It is to be noted that the motor 148 and the encoder 152 correspond to the motor 12 and the encoder 30 shown in FIG. 7, respectively.

The fuzzy control apparatus for the jet loom 110 includes a fuzzy inference circuit 156 for fuzzy-inferring a modification value to a parameter for weft yarn insertion using a plurality of flying states of a weft yarn, a plurality of membership functions and a plurality of fuzzy control rules. The flying information of a weft yarn, that is, a flying state, is selected from various data mentioned hereinabove.

In the following description, as a flying state of a weft yarn, are used detailed values $\mu$ and $\sigma$ of an average value and a dispersion (standard deviation) of the final release timing which is a rotational angle (final release angle) of the main shaft 146 when the last winding of the weft yarn 112 is released from the metering storage apparatus 114 and detailed values $\mu$ and $\sigma$ of an average value and a dispersion (standard deviation) of the final arriving timing which is a rotational angle (final arrival angle) of the main shaft 146 when an end of the weft yarn is detected by a weft yarn feeler 166 provided on the side opposite to the yarn supply side.

Further, in the following description, a modification value to the rotational frequency is fuzzy-inferred by the fuzzy control apparatus shown in FIGS. 7 and 8 and the rotational frequency of the motor 148 and the pressure of the weft yarn inserting fluid are controlled. Further, as a dispersion, a standard deviation is used. Further, both of the pressure (main pressure) of the working fluid to be jetted from the main nozzle 132 and the pressure (subpressure) of the working fluid to be jetted from the subnozzles 134 are controlled.

The fuzzy control apparatus include a storage unit 158 in which a plurality of membership functions and a plurality of fuzzy control rules to be used for fuzzy inference by the fuzzy inference circuit 156 are stored, an inputting circuit 160 for setting various information, a pressure controller 162 for controlling the pressure regulators 138 and 142 based on a modification amount supplied from the fuzzy inference circuit 156, and a rotational frequency controller 164 for operating the motor 148 based on a modification amount supplied from the fuzzy inference circuit 156.

It is to be noted that the fuzzy inference circuit 156 and the storage unit 158 correspond to the fuzzy inference circuit 20 shown in FIG. 7. The rotational frequency controller 164 corresponds to the instruction circuit 18, adder 22 and rotational frequency changing circuit 24 shown in FIG. 7. The pressure regulators 138 and 142 and the pressure controller 162 correspond to the pressure instruction circuit 54, adder 56 and pressure changing circuit 58 shown in FIG. 7, respectively.

Membership functions to be used for fuzzy inference are the plurality of membership functions for rotational frequency control illustrated in FIGS. 2(A), 2(B) and 2(C) and a plurality of membership functions for pressure control similar to the membership functions for rotational frequency control, and they are stored in the storage unit 158. The membership functions for pressure control are provided for modification of the average value $\mu$ and the standard deviation $\sigma$ of the flying state and the pressure modification.

The membership functions P, N and Z for pressure control for the average value and the standard deviation are the same as the corresponding membership functions P, N and Z for rotational frequency control illustrated in FIGS. 2(A) and 2(B). Therefore, the membership functions for pressure control for the average value and the standard deviation are used in common with the corresponding membership functions for rotational frequency control illustrated in FIGS. 2(A) and 2(B), respectively.

The membership functions P, N and Z for pressure modification are the same as the membership functions P, N and Z for rotational frequency control illustrated in FIG. 2(C) except that the object of the modification is the pressure. Therefore, the membership functions for pressure modification are used commonly with the corresponding membership functions for rotational frequency control illustrated in FIG. 2(C).

However, the membership functions for rotational frequency control and the membership functions for pressure control may all be provided separately or part of them may be used in common while the remaining ones are provided separately.

The storage unit 158 may be formed from a storage circuit such as an IC memory. However, it is preferable to use a card type IC memory which allows writing and reading out of information, that is, a memory card 158a, and a writing/reading mechanism 158b for writing and reading out information into and from the memory card 158a. Where such memory card 158a and writing/reading mechanism 158b as just described are used, the membership functions and the fuzzy control rules to be used for fuzzy inference can be modified or altered readily.

The inputting circuit 160 includes a plurality of setting units which serve as the setting units 14, 34 and 52 shown in FIG. 7, and includes inputting units such as a setting unit and a keyboard for inputting various data to be used for calculation of an average value and a standard deviation of an arriving timing, fuzzy inference of a modification amount and so forth.

Other data to be set or inputted making use of the inputting units may include a weft insertion time number n, a starting timing of beating, an initial fluid pressure, an initial set value for a jetting interval and so forth. However, such data may otherwise be inputted from the storage unit 158 to the fuzzy inference circuit 156 so that they may be supplied from the fuzzy inference circuit 156 to the other circuits.

The pressure controller 162 controls the pressure regulators 138 and 142 so that the pressures of the weft yarn inserting fluid to be jetted from the main nozzle 132 and the subnozzles 134 may be adjusted in accordance with the modification amounts supplied thereto from the fuzzy inference circuit 156. Meanwhile, the rotational frequency controller 164 controls the rotational frequency of the motor 148 in accordance with the modification amount supplied thereto from the fuzzy inference circuit 156.

The pressure controller 162 controls the opening and closing valves 140 and 144 and the electromagnetic solenoid 124 to operate so that the jetting interval and the weft yarn release starting timing may be a predetermined interval and a predetermined timing, respectively.

The fuzzy control apparatus further includes a weft yarn feeler (first detector) 166 for detecting that a weft yarn 112 has been inserted to the last end, and a release sensor (second detector) 168 for detecting that weft yarn windings on a drum are released and counting the released windings and for detecting that the last weft yarn winding of the weft yarn windings for one pick is released.

The weft yarn feeler 166 and the release sensor 168 correspond to the weft yarn feeler 28 and the release sensor 26 shown in FIG. 7, respectively. For such feeler and sensor, an optical sensor employing a photoelectric converter may be used.

An output signal of the weft yarn feeler 166 is supplied to a detection circuit 170 which detects the final arriving timing of the weft yarn 112. Meanwhile, an output signal of the release sensor 168 is supplied to another detection circuit 172 which detects the final release timing of the weft yarn 112.

The detection circuit 170 detects, based on a rotational angle signal supplied from the encoder 152 and an output signal of the weft yarn feeler 166, a rotational angle of the main shaft 146 when the end of the weft yarn 112 arrives at the position of the weft yarn feeler 166 as a value representative of the final arriving timing for each weft yarn insertion, and outputs the thus detected final arriving timing to two calculators 174 and 176.

The detection circuit 172 detects, based on a rotational angle signal supplied from the encoder 152 and an output signal of the release sensor 168, a rotational angle of the main shaft 146 when the last weft yarn winding is released as a value representative of the last release timing for each weft yarn insertion, and outputs the thus detected last release timing to the calculators 174 and 176.

The last arriving timing and the last release timing can be used as rotational angles themselves of the main shaft 146 when a number of output signals equal to the number of weft yarn windings for one pick are supplied from the corresponding feeler 166 and sensor 168 to the corresponding detection circuits 170 and 172.

The calculator 174 is an average value calculator for calculating an average value of the final arriving timing and an average value of the final release timing within the number k of times of weft yarn insertion supplied from the inputting circuit 160, and supplies the two average values thus calculated to the fuzzy inference circuit 156. It is to be noted that, in place of the average values, statistic amounts such as medians, final values, maximum values or minimum values may be used.

Meanwhile, the calculator 176 is a dispersion calculator for calculating a standard deviation of the final arriving timing and a standard deviation of the last release timing within the number k of times of weft yarn insertion time number k supplied from the inputting circuit 160, and supplies the thus calculated standard deviations to the fuzzy inference circuit 156. In place of the standard deviations, some other values represented quantitatively by variances, ranges or the like known in the statistics may be used.

Various data set or inputted to the jet loom 110, a result of inference of the fuzzy inference circuit 156 and so forth are conveyed to an annunciation apparatus 178 such as monitor. A weft yarn selection apparatus 180 corresponding to the weft yarn selection circuit 16 shown in FIG. 7 receives an output signal of the encoder 152 and supplies a predetermined weft yarn selection signal to the two controllers 162 and 164.

FIGS. 9 and 10 illustrate an example of fuzzy control rules R2/1 to R2/81 in accordance with which the rotational frequency of the motor and the pressures (main pressure and sub pressure) of the weft yarn inserting fluid are to be controlled using average values and standard deviations of the final arriving timing (hereinafter referred to simply as "arriving timing") and the final release timing (hereinafter referred to simply as "release timing") of a weft yarn.

Referring to FIGS. 9 and 10, the membership functions P, Z and N in the column of "Input" signify that the corresponding average value or standard deviation is "late" or "large", "appropriate", and "early" or "small", respectively, similarly as in the description given hereinabove with reference to FIGS. 2(A) to 2(C). Similarly, the membership functions P, Z and N in the column of "Output" signify that the corresponding rotational frequency or pressure is "raised", "kept unchanged", and "lowered", respectively.

In FIGS. 9 and 10, each of the fuzzy control rules R2/1 to R2/81 is represented by a combination of such membership functions P, Z and N as described above. Meanings of some control rules are described as representatives below.

R2/1: If the average values of the release timing and the arriving timing are both late (P) and the standard deviations of the release timing and the arriving timing are both large (P), then the rotational frequency is lowered (N) and the pressure is raised (P).

R2/10: If the average values of the release timing and the arriving timing are both late (P) while the standard deviation of the release timing is appropriate (Z) and the standard deviation of the arriving timing is large (P), then the rotational frequency is lowered (N) and the pressure is raised (P).

R2/20: If the average values of the release timing and the arriving timing are both late (P) while the standard deviation of the release timing is small (N) and the standard deviation of the arriving timing is appropriate (Z), then the rotational frequency is lowered (N) and the pressure is maintained (Z).

R2/30: If the average value of the release timing is appropriate (Z) and the average value of the arriving timing is late (P) while the standard deviation of the release timing is large (P) and the standard deviation of the arriving timing is small (N), then the rotational frequency is lowered (N) and the pressure is raised (P).

R2/40: If the average values of the release timing and the arriving timing are both appropriate (Z) while the standard deviation of the release timing is appropriate (Z) and the standard deviation of the arriving timing is large (P), then the rotational frequency is maintained (Z) and the pressure is raised (P).

R2/50: If the average values of the release timing and the arriving timing are both appropriate (Z) while the standard deviation of the release timing is small (N) and the standard deviation of the arriving timing is appropriate (Z), then both of the rotational frequency and the pressure are maintained (Z).

R2/60: If the average value of the release timing is early (N) and the average value of the arriving timing is appropriate (Z) while the standard deviation of the release timing is large (P) and the standard deviation of the arriving timing is small (N), then the rotational frequency is maintained (Z) and the pressure is raised (P).

R2/70: If the average values of the release timing and the arriving timing are both early (N) while the standard deviation of the release timing is appropriate (Z) and the standard deviation of the arriving timing is large (P), then the rotational frequency is maintained (Z) and the pressure is raised (P).

R2/80: If the average values of the release timing and the arriving timing are both early (N) while the standard deviation of the release timing is small (N) and the standard deviation of the arriving timing is appropriate (Z), then the rotational frequency is raised (P) and the pressure is maintained (Z).

Subsequently, a method of inferring modification amounts to a rotational frequency and a pressure is described with reference to FIGS. 11 to 16.

The fuzzy inference circuit 156 obtains, when a control starting instruction is inputted thereto, various data outputted from the inputting circuit 160, various membership functions illustrated in FIGS. 2(A) to 2(C) and stored in the storage unit 158, and the fuzzy control rules R2/1 to R2/81 stored in the storage unit 158.

Then, when the number of times of weft yarn insertion reaches the predetermined value n, the fuzzy inference circuit 156 obtains two average values outputted from the calculator 174 and two standard deviations outputted from the calculator 176, and determines coincidence degrees of the average values and the standard deviations of the flying timings of the weft yarn with the antecedents of the fuzzy control rules R2/1 to R2/81, that is, grades W2/1 to W2/81 of membership, for the individual fuzzy control rules R2/1 to R2/81 based on the obtained various data.

Then, the fuzzy inference circuit 156 determines, based on the thus determined grades W2/1 to W2/81 of membership functions and the membership functions illustrated in FIG. 2(C), the consequent parts of the fuzzy control rules R2/1 to R2/81, i.e. the functions U2/1 to U2/81, for the individual fuzzy control rules R2/1 to R2/81 for each of the rotational frequencies and pressures.

The grades W2/1 to W2/81 of membership and the functions U2/1 to U2/81 can be determined in a similar manner as described hereinabove with reference to FIG. 5. This is described below taking the fuzzy control rule R2/4 as a representative.

The fuzzy inference circuit 156 first determines the grades of membership with the membership functions P, Z and N set in the antecedent part of the fuzzy control rule R2/4 corresponding to the average values and the standard deviations of the last release timing and the final arriving timing, and sets a common portion of the grades of membership as a grade W2/4 of membership corresponding to the antecedent part of the fuzzy control rule R2/4.

Then, the fuzzy inference circuit 156 clips the membership functions P, Z and N of the consequent part of the fuzzy control rule R2/4 with the grade W2/4 of membership determined as described above, and determines a minimum value (indicated by slanting lines in FIG. 11) between the grade W2/4 of membership and the membership functions P, Z and N. Consequently, a function U2/4 for the rotational frequency and the pressure regarding the fuzzy control rule R2/4 is inferred.

Similarly, also the functions U2/1 to U2/3 and U2/5 to U2/81 regarding another fuzzy control rules R2/1 to R2/3 and R2/5 to R2/81 are inferred for the rotational frequency and the pressure. When the grade W of membership is zero, also the corresponding function U is zero.

Then, the fuzzy inference circuit 156 superposes the functions U2/1 to U2/81 for the rotational frequency and the functions U2/1 to U2/81 for the standard deviation on each other for the individual rotational frequencies and pressures to compose them into composite membership functions for the rotational frequency and the pressure, and then calculates the values $\Delta\Omega$ and $\Delta p$ of the centers of gravity of the composite membership functions for the rotational frequency and the pressure.

The values $\Delta\omega$ and $\Delta p$ of the centers of gravity are values on the axis of abscissa with which the areas of the corresponding composite membership functions are halved, and the fuzzy inference circuit 156 sets the values as measurement values of a result of inference of the entire fuzzy control rules R2/1 to R2/81, that is, as the modification amount $\Delta\omega$ to be used for adjustment of the rotational frequency and the modification amount $\Delta p$ to be used for adjustment of the pressure.

Then, the fuzzy inference circuit 156 supplies the calculated modification amounts $\Delta\omega$ and $\Delta p$ to the controllers 164 and 162, respectively. The controllers 164 and 162 add the modification amounts $\Delta\omega$ and $\Delta p$ supplied thereto to the rotational frequency and the pressure at present to calculate a new rotational frequency and pressure.

The new rotational frequency is higher than the present rotational frequency if the modification amount $\Delta\omega$ is in the positive, but is lower than the present rotational frequency if the modification amount $\Delta\omega$ is in the negative. Similarly, the new pressure is higher than the present jetting pressure if the modification amount $\Delta p$ is in the positive, but is lower than the present jetting pressure if the modification amount $\Delta p$ is in the negative. Consequently, the controllers 162 and 164 control the motor 148 and the pressure regulators 138 and 142 so that the new rotational frequency and pressure may be obtained.

The new rotational frequency and pressure need not be calculated by the controllers 164 and 162, but may be calculated by the fuzzy inference circuit 156. The calculated frequency and pressure may be supplied from the fuzzy inference circuit 156 to the controllers 164 and 162, respectively.

The modification to the rotational frequency and the pressure may be performed for each weft yarn insertion using the flying states of a weft yarn in the past by the number k of times of weft yarn insertions or may be performed for each fixed n times of weft yarn insertions using the flying state of a weft yarn in the past by k times of weft yarn insertions. In this instance, n and k may be n=k.

The modification amount Δp may be determined only for the main pressure or only for the subpressure or separately for both of the main pressure and the subpressure, or else as a common value for the main pressure and the subpressure.

While, in the fuzzy control apparatus described hereinabove with reference to FIGS. 7 and 8, modification amounts of the rotational frequency and the pressure are fuzzy-inferred based on an average value and a dispersion of a release timing and an average value and a dispersion of an arriving timing, modification amounts of the rotational frequency and the pressure may be fuzzy-inferred alternatively, for example, based on an average value and a dispersion of a release timing, based on an average value and a dispersion of an arriving timing, based on an average value of an arriving timing and a dispersion of a release timing, or based on an average value of a release timing and a dispersion of an arriving timing.

While, in the fuzzy control apparatus described above, one, two or more flying states are used, a modification amount for the motor may be fuzzy-inferred using one, two or more other data such as an operation condition of looms such as the number of looms in a stopping condition, a quality condition of a woven fabric such as whether or not the weaving width is good, a weft yarn condition such as whether or not a weft yarn is good, and a working time condition of an operator such as a working condition of an operator, and one, two or more flying states.

Where the fuzzy control apparatus of the present invention is applied to an air jet loom which performs weaving of a pile fabric with weft yarns of multiple colors inserted therein as in the embodiments described hereinabove, it functions effectively particularly at a border texture portion of the fabric at which various weft yarns are used. Further, the fuzzy control apparatus of the present invention can be applied also to a jet loom of the multiple color weft yarn insertion type which performs weaving of fabrics other than a pile fabric and also for a jet loom which inserts a single weft yarn.

While preferred embodiments of the present invention have been described using specific terms, such description is for illustrative purpose only, and it is to be understood that changes and variations may be made without departing from the spirit or scope of the following claims.

What is claimed is:

1. A fuzzy control apparatus for a jet loom, comprising:
   flying state detection means for detecting a flying state of a weft yarn;
   fuzzy inference means for performing fuzzy inference to determine a modification amount to a rotational frequency of a motor based on a detection value detected by said detection means; and
   control means for driving said motor to rotate at a predetermined rotational frequency and correcting the rotational frequency of said motor based on the modification amount.

2. A fuzzy control apparatus according to claim 1, wherein said fuzzy inference means further determines, based on the detection value, a modification amount to a pressure of weft yarn inserting fluid to be supplied to a weft yarn inserting nozzle, and said control means further supplies the weft yarn inserting fluid at a predetermined pressure to said weft yarn inserting nozzle and corrects the pressure of the weft yarn inserting fluid based on the modification amount to the pressure.

3. A fuzzy control apparatus according to claim 2, wherein said control means drives said motor to rotate at a reference rotational frequency set in advance and corrects the rotational frequency of said motor based on the modification amount, and supplies the weft yarn inserting fluid at a reference pressure set in advance to said weft yarn inserting nozzle and corrects the pressure of the weft yarn inserting fluid based on the modification amount to the pressure.

* * * * *

UNITED STATES PATENT AND TRADEMARK OFFICE
CERTIFICATE OF CORRECTION

PATENT NO. : 6,314,335 B1  Page 1 of 1
DATED : November 6, 2001
INVENTOR(S) : Tsutomu Sainen et al.

It is certified that error appears in the above-identified patent and that said Letters Patent is hereby corrected as shown below:

<u>Column 5,</u>
Line 5, "values μ and a" should read -- values μ and σ --.
Line 42, "deviation a" should read -- deviation σ --.
Line 46, "deviation a" should read -- deviation σ --.

<u>Column 6,</u>
Line 55, "W1/9of" should read -- W1/9 of --.

<u>Column 14,</u>
Line 39, "values ΔΩ" should read -- values Δω --.

Signed and Sealed this

Fourth Day of June, 2002

Attest:

JAMES E. ROGAN
Attesting Officer  Director of the United States Patent and Trademark Office